United States Patent
Liao et al.

(10) Patent No.: US 9,625,908 B2
(45) Date of Patent: Apr. 18, 2017

(54) METHODS AND SYSTEMS FOR MOBILE-AGENT NAVIGATION

(71) Applicant: Sharp Laboratories of America, Inc., Camas, WA (US)

(72) Inventors: Miao Liao, Camas, WA (US); Xinyu Xu, Duluth, GA (US); Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/881,005

(22) Filed: Oct. 12, 2015

(65) Prior Publication Data
US 2016/0062359 A1    Mar. 3, 2016

Related U.S. Application Data

(62) Division of application No. 14/476,574, filed on Sep. 3, 2014, now Pat. No. 9,157,757.

(51) Int. Cl.
| | |
|---|---|
| G05D 1/00 | (2006.01) |
| G01C 21/20 | (2006.01) |
| G05D 1/02 | (2006.01) |
| G01C 21/34 | (2006.01) |

(52) U.S. Cl.
CPC ........... G05D 1/0088 (2013.01); G01C 21/20 (2013.01); G01C 21/34 (2013.01); G05D 1/0234 (2013.01); G05D 1/0246 (2013.01); G05D 1/0253 (2013.01)

(58) Field of Classification Search
None
See application file for complete search history.

(56) References Cited

U.S. PATENT DOCUMENTS

| | | | | |
|---|---|---|---|---|
| 7,340,076 | B2* | 3/2008 | Stach | G06T 1/0021 382/100 |
| 8,022,812 | B2* | 9/2011 | Beniyama | G05D 1/024 235/375 |
| 8,174,568 | B2* | 5/2012 | Samarasekera | G01C 21/005 348/113 |
| 8,238,612 | B2* | 8/2012 | Susca | G06T 7/2033 348/154 |
| 8,340,901 | B2* | 12/2012 | Fahn | G05D 1/0246 348/142 |
| 8,447,863 | B1* | 5/2013 | Francis, Jr. | H04W 4/02 707/724 |
| 8,661,605 | B2* | 3/2014 | Svendsen | A47L 5/30 15/319 |
| 8,663,130 | B2* | 3/2014 | Neubach | A61B 8/485 600/407 |
| 8,705,842 | B2* | 4/2014 | Lee | G05D 1/0274 382/153 |
| 8,825,387 | B2* | 9/2014 | Mays | G01C 21/20 701/433 |
| 8,918,241 | B2* | 12/2014 | Chen | G05D 1/0219 318/568.12 |
| 8,929,604 | B2* | 1/2015 | Platonov | G01C 21/3602 382/104 |

(Continued)

*Primary Examiner* — Jonathan M Dager
(74) *Attorney, Agent, or Firm* — Alleman Hall McCoy Russell & Tuttle LLP

(57) ABSTRACT

Aspects of the present invention are related to methods and systems for autonomous navigation using visual landmark recognition.

10 Claims, 8 Drawing Sheets

(56) References Cited

U.S. PATENT DOCUMENTS

| | | | |
|---|---|---|---|
| 8,937,410 B2* | 1/2015 | Comins | B25J 13/08 307/326 |
| 2004/0167667 A1* | 8/2004 | Goncalves | G01C 21/12 700/245 |
| 2006/0055530 A1* | 3/2006 | Wang | G01S 5/02 340/539.13 |
| 2006/0056707 A1* | 3/2006 | Suomela | G06K 7/10712 382/232 |
| 2006/0058921 A1* | 3/2006 | Okamoto | G05D 1/0214 700/255 |
| 2007/0027579 A1* | 2/2007 | Suzuki | G05D 1/0251 700/245 |
| 2007/0061041 A1* | 3/2007 | Zweig | G05D 1/0261 700/245 |
| 2007/0100498 A1* | 5/2007 | Matsumoto | G05D 1/024 700/245 |
| 2007/0188328 A1* | 8/2007 | Mochizuki | G06K 7/0008 340/572.7 |
| 2007/0271003 A1* | 11/2007 | Bang | G05D 1/0272 700/245 |
| 2008/0077511 A1* | 3/2008 | Zimmerman | G06Q 10/00 705/28 |
| 2009/0012667 A1* | 1/2009 | Matsumoto | G05D 1/0251 701/26 |
| 2009/0074545 A1* | 3/2009 | Lert, Jr. | B65G 1/0492 414/276 |
| 2009/0207257 A1* | 8/2009 | Jung | G06T 7/0042 348/208.1 |
| 2010/0076631 A1* | 3/2010 | Mian | G05D 1/0229 701/19 |
| 2010/0152944 A1* | 6/2010 | Kouno | G05D 1/024 701/26 |
| 2010/0155156 A1* | 6/2010 | Finkelstein | B25J 5/007 180/54.1 |
| 2010/0235032 A1* | 9/2010 | Sung | G05D 1/0246 701/25 |
| 2011/0106312 A1* | 5/2011 | Chen | B25J 9/1697 700/259 |
| 2012/0121161 A1* | 5/2012 | Eade | G09B 29/007 382/153 |
| 2013/0231779 A1* | 9/2013 | Purkayastha | B25J 9/1697 700/259 |
| 2015/0127247 A1* | 5/2015 | Xu | G01C 21/34 701/411 |
| 2016/0271795 A1* | 9/2016 | Vicenti | B25J 9/163 |
| 2016/0327383 A1* | 11/2016 | Becker | G01B 11/005 |

\* cited by examiner

METHODS AND SYSTEMS FOR MOBILE-AGENT NAVIGATION

CROSS REFERENCE TO RELATED APPLICATIONS

This application is a division of U.S. patent application Ser. No. 14/476,574, entitled "Methods and Systems for Mobile-Agent Navigation," filed Sep. 3, 2014, invented by Miao Liao, Xinyu Xu and Petrus J. L. van Beek, said application, U.S. patent application Ser. No. 14/476,574, is hereby incorporated by reference herein, in its entirety.

FIELD OF THE INVENTION

Embodiments of the present invention relate generally to methods and systems for autonomous navigation and, in particular, to methods and systems for autonomous navigation using visual landmark recognition.

BACKGROUND

Several capabilities may be required for a mobile agent, for example, a vehicle, a robot and other mobile agents, to achieve autonomous navigation. For example, the mobile agent may require methods for determining its position, knowledge of its environment, methods for path planning and methods for obstacle avoidance. However, many autonomous navigation systems rely on high-end, expensive sensors, for example, laser scanners, high accuracy GPS receivers, orientation sensors and other high-end, expensive sensors, making these autonomous navigation systems unaffordable for many applications. Reliable, low-cost alternatives may be desirable.

SUMMARY

Some embodiments of the present invention comprise methods and systems for autonomous navigation using visual landmark recognition.

According to a first aspect of the present invention, color-based landmark-object detection may be used to identify a plurality of landmark objects. A distance and a bearing may be computed for each landmark object, and a nearest landmark object may be selected. The distance from the mobile agent to the nearest landmark object and the bearing angle of the mobile agent relative to the nearest landmark object may be used to compute a mobile-agent speed control value and a mobile-agent steering control value. The mobile-agent speed control value and the mobile-agent steering control value may be sent to a control component of the mobile agent effectuating movement of the mobile agent toward the nearest landmark object.

According to a second aspect of the present invention, a machine-readable code may be associated with a landmark object and may be used to compute a mobile-agent position and orientation relative to the landmark object. A route may be identified by a plurality of landmark-object identifiers, wherein each landmark-object identifier in the plurality of landmark-object identifiers may be associated with a position of a corresponding landmark object and autonomous navigation of the route may be effectuated.

According to a third aspect of the present invention, Visual Odometry may be used for monitoring and controlling a turning angle.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 9:
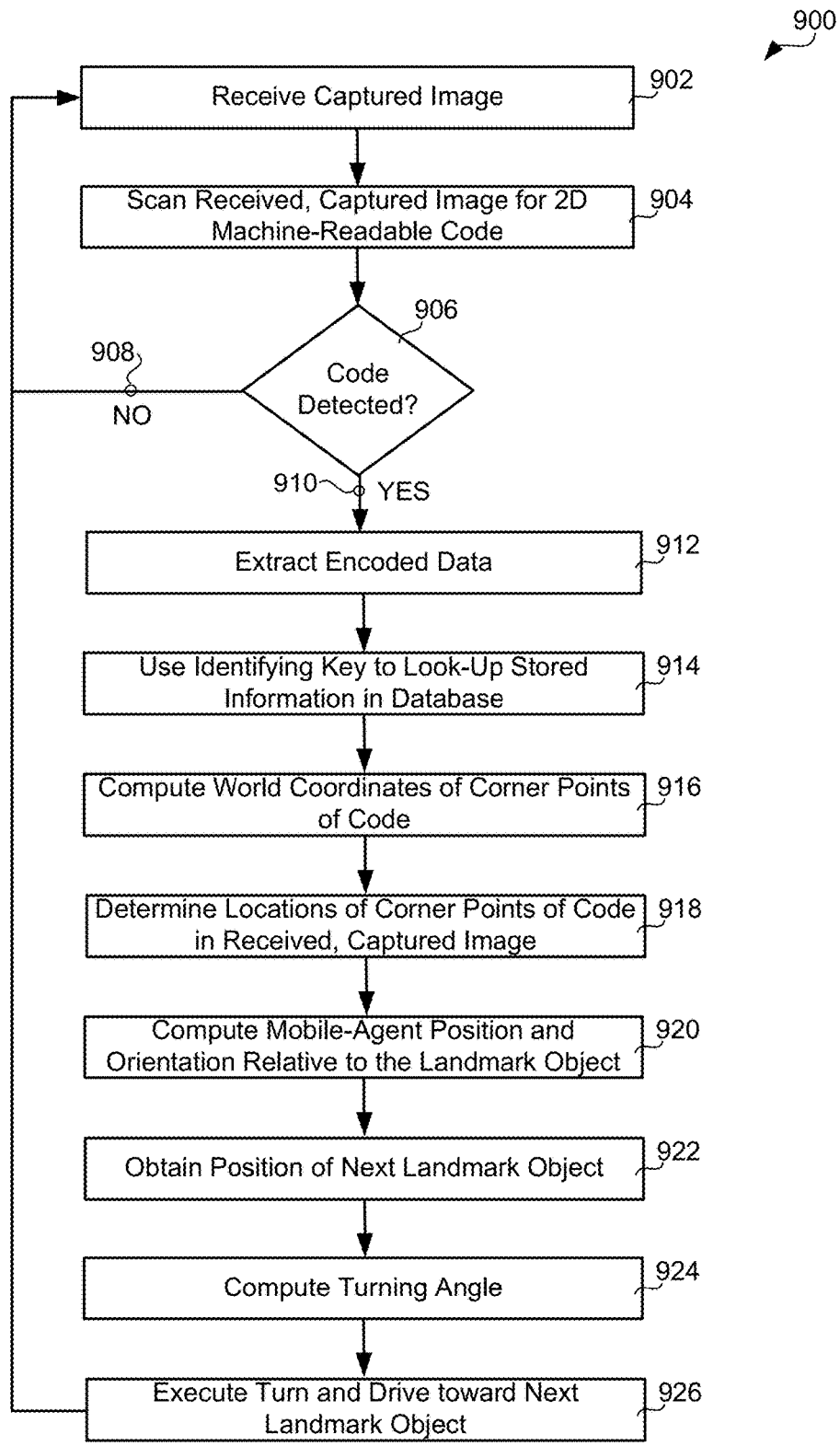
Figure 10:
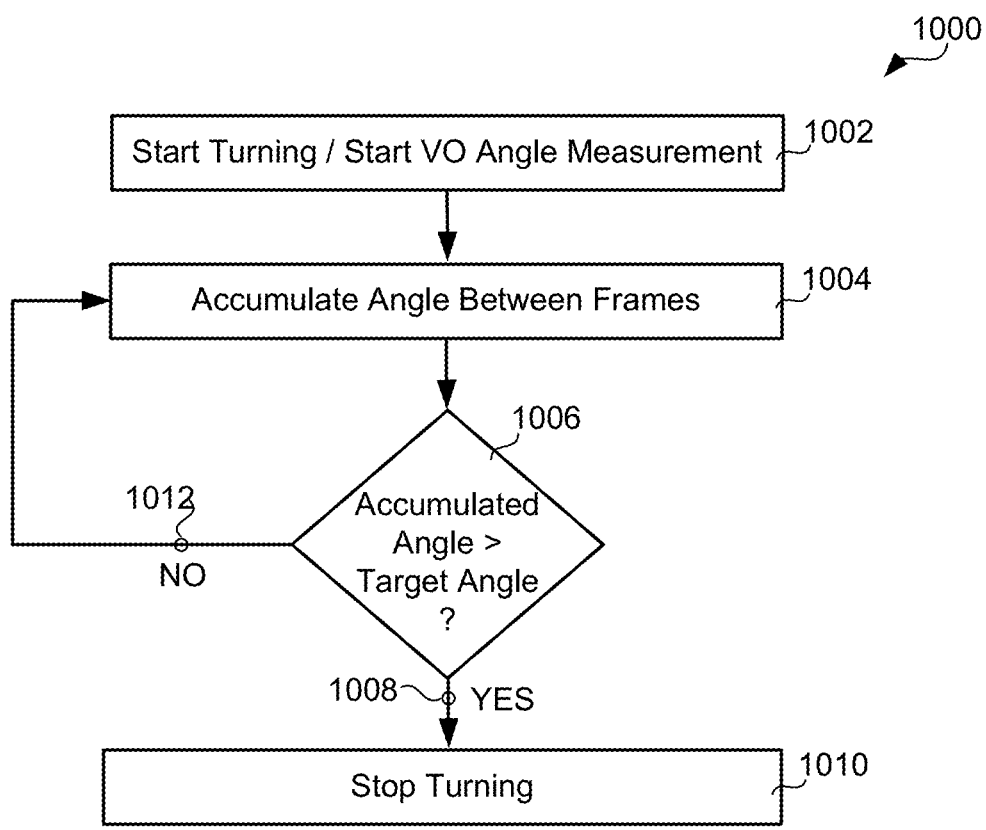

FIG. 9 is a chart showing exemplary embodiments of the present invention comprising a route that may be identified by a plurality of landmark-object identifiers, wherein each landmark-object identifier in the plurality of landmark-object identifiers may be associated with a position of a corresponding landmark object and autonomous navigation of the route defined by the ordered plurality of landmark-object identifiers; and FIG. 10 is a chart showing exemplary embodiments of the present invention comprising Visual Odometry for monitoring and controlling a turning angle.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Several capabilities may be required for a mobile agent to achieve autonomous navigation. For example, the mobile agent may require methods for determining its position, knowledge of its environment, methods for path planning and methods for obstacle avoidance. However, many autonomous navigation systems rely on high-end, expensive sensors, for example, laser scanners, high accuracy GPS receivers, orientation sensors and other high-end, expensive sensors, making these autonomous navigation systems unaffordable for many applications. Reliable, low-cost alternatives may be desirable.

Some embodiments of the present invention comprise methods and systems for autonomous mobile-agent navigation based on landmarks. The mobile agent may be equipped with a forward-looking monocular color camera, and the landmarks may be man-made visual markers, also referred to as landmark objects, with a unique color and/or shape pattern that may rarely be found in natural scenes. Landmark objects may be placed at known geo-referenced positions during a site mapping/preparation stage. An ideal landmark object may be visually detected from a long range to provide a beacon for navigation. A detected landmark object may be visually tracked thereby providing continuous guidance for mobile-agent autonomous navigation. Additionally, in some embodiments of the present invention, a landmark object may be associated with an identifier that may link to geographic position data and other information about the landmark.

Figure 1:
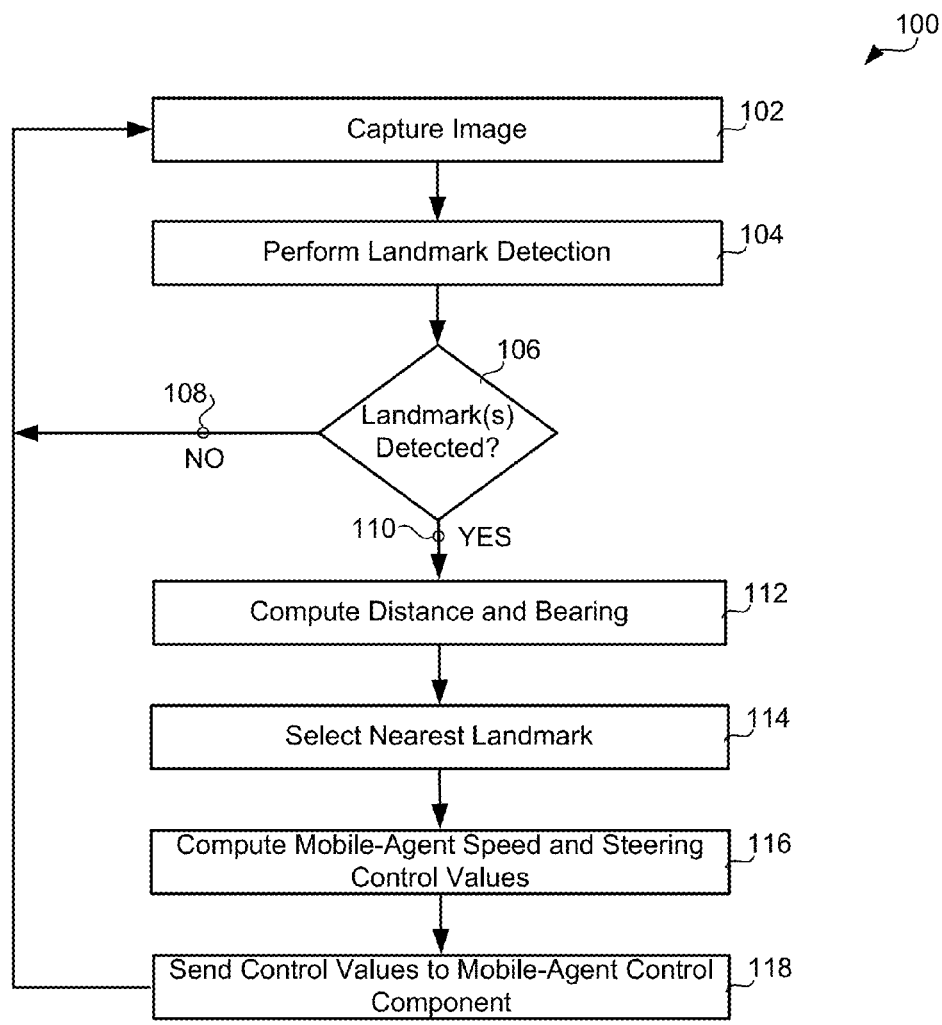
FIG. 1 is a chart showing exemplary embodiments of the present invention comprising visual landmark detection, determination of a nearest landmark object and computation of a mobile-agent speed control value and a mobile-agent steering control value based on a distance to the nearest landmark object and a bearing of the nearest landmark object relative to the mobile agent.

Some embodiments of the present invention comprising a method 100 for autonomous mobile-agent navigation may be described in relation to FIG. 1. An image may be captured 102 using a forward-looking monocular color camera mounted on a mobile agent. Landmark detection may be performed 104 to detect any landmark objects within the captured image. A determination may be made 106 as to whether or not one or more landmark objects are detected in the captured image. If no landmark object is detected 108, then the process may continue by capturing 102 a next image. If one or more landmark objects are detected 110, then for each detected landmark object, a distance to the landmark object and a bearing angle relative to the mobile agent may be computed 112. The nearest landmark object may be selected 114, and speed and steering control values for the mobile agent may be computed 116. The control values may be sent 118 to a control component in the mobile agent, and the process may continue by capturing 102 a next image.

Figure 2:
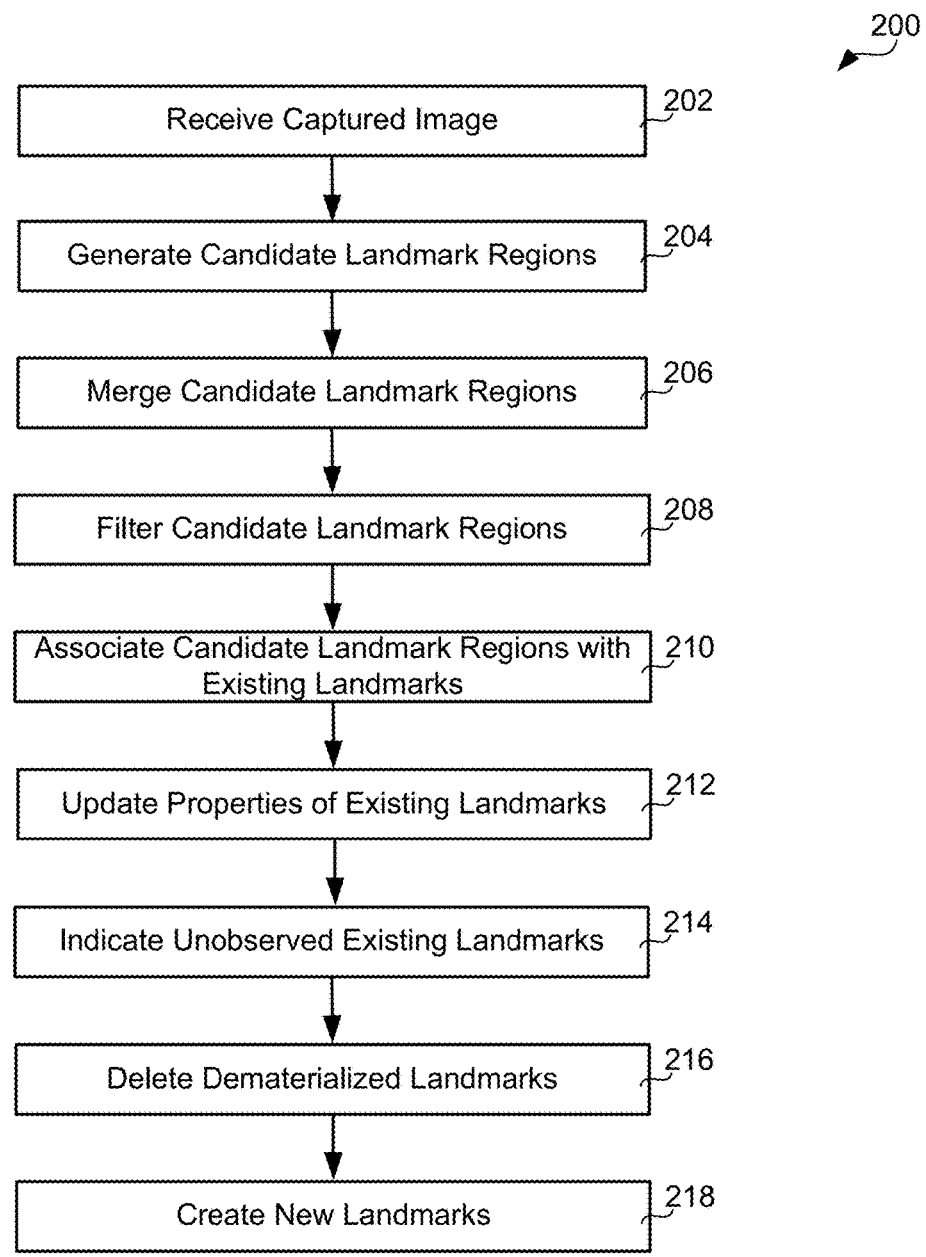
FIG. 2 is chart showing exemplary embodiments of the present invention comprising visual landmark detection.

In some embodiments of the present invention, landmark detection 104 may be performed according to a method 200 described in relation to FIG. 2. In these embodiments, the captured image may be received 202 in a landmark-detection processor component. Candidate landmark regions may be generated 204 from the received image. In some embodiments of the present invention, candidate-landmark-region generation may comprise color-based detection based on a color model, for example, an RGB color model, an HSV color model and other color models. Based on the color model, a likelihood of a pixel belonging to a landmark object may be evaluated on a pixel-by-pixel basis, thereby producing a pixel-likelihood map. Pixel-based thresholding may be performed on the pixel-likelihood map, thereby producing a binary object map. Connected-component analysis may be performed on the binary object map, thereby identifying candidate landmark regions. Small, proximately located candidate landmark regions may be merged 206 into a larger candidate landmark region, and filtering 208 of the resulting candidate landmark regions may be performed to remove any candidate landmark region that violates a pre-defined restriction on shape and/or size. In some embodiments of the present invention, a binary landmark-object map may be generated. One of the binary values may be associated with landmark-object pixels, and the other of the binary values may be associated with non-landmark-object pixels. The resulting candidate landmark regions may be associated 210 with existing landmarks.

In some embodiments of the present invention, a plurality of feature values may be computed for each candidate landmark region and compared to previously computed, stored feature values for each existing landmark. Exemplary features may include location, shape, size, color distribution, texture, edge content and other image features known in the art. When the feature values of a candidate landmark region match the feature values of an existing landmark, the candidate landmark region may be associated 210 with the existing landmark. A person having ordinary skill in the art will readily recognize many methods known in the art for performing feature matching.

The stored feature values of an existing landmark may be updated 212 when the existing landmark is associated with a candidate landmark region. The stored feature values of the existing landmark associated with a candidate landmark region may be updated 212 based on the feature values of the candidate landmark region. In some embodiments of the present invention, the stored feature values may be updated to the feature values of the candidate landmark region. In alternative embodiments, the stored feature values may be updated based on a weighting of the stored feature values and the feature values of the candidate landmark region.

Existing landmarks that are not associated with a candidate landmark may be marked 214 as unobserved. In some embodiments of the present invention, a counter may be associated with existing landmark. In some embodiments of the present invention, the counter associated with an existing landmark may be initialized to zero and may be incremented for each captured image in which the landmark is unobserved. In alternative embodiments of the present invention, the counter associated with an existing landmark may be initialized to a non-zero value and may be decremented for each captured image in which the landmark is unobserved. When a landmark is unobserved for a predetermined number of captured images, the landmark may be considered dematerialized and may be deleted 216 from the record of existing landmarks.

If a candidate landmark region is not associated with an existing landmark, a new landmark, based on the unassociated candidate landmark region, may be created 218 and added to the record of existing landmarks. In some embodiments of the present invention, a newly added landmark may be differentiated in the record of existing landmarks from a landmark placed and generated during a site-mapping/route preparation stage.

Figure 3A:
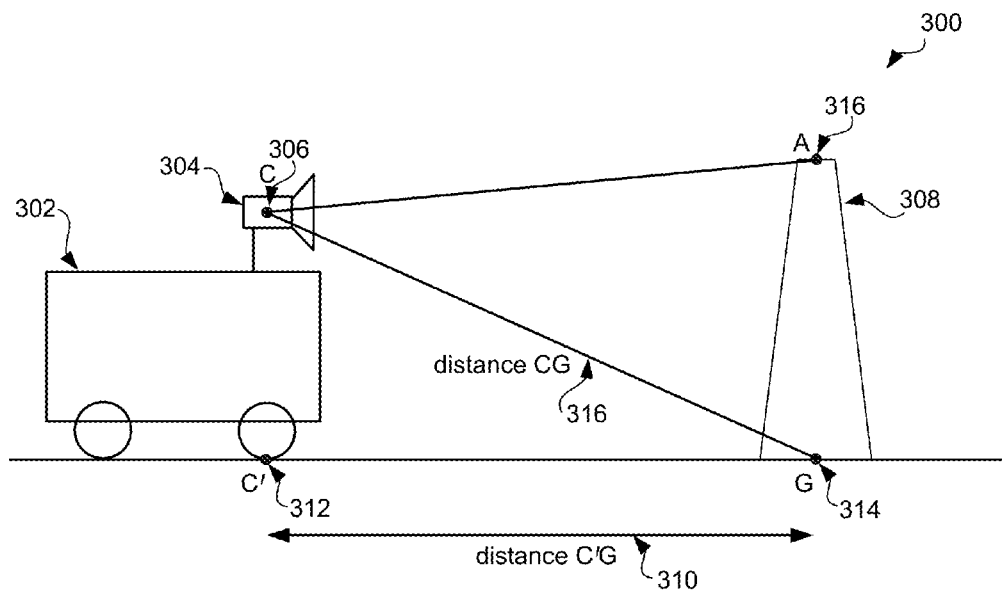
FIG. 3A is a picture illustrating a distance from a mobile agent to a landmark object.

Referring again to FIG. 1, if one or more, landmarks are detected 110, then for each detected landmark, a distance to the landmark and a bearing angle relative to the mobile agent may be computed 112. FIG. 3A depicts an exemplary scene, shown from a side view 300, illustrating a distance computed in some embodiments of the present invention. A mobile agent 302 with an onboard camera 304 with projection center, C, 306 may capture an image of a landmark object 308. In some embodiments of the present invention, the distance computed may be the distance, C'G, 310 between the projection, C', 312 of the camera projection center, C, 306 on the ground and a point, G, 314 at which the landmark object 308 touches the ground. In alternative embodiments, the distance computed may be the distance, CG, 316 between the camera projection center, C, 306 and the point, G, 314 at which the landmark object 308 touches the ground. A top point 316 of the landmark object 308 may be denoted A.

Figure 3B:
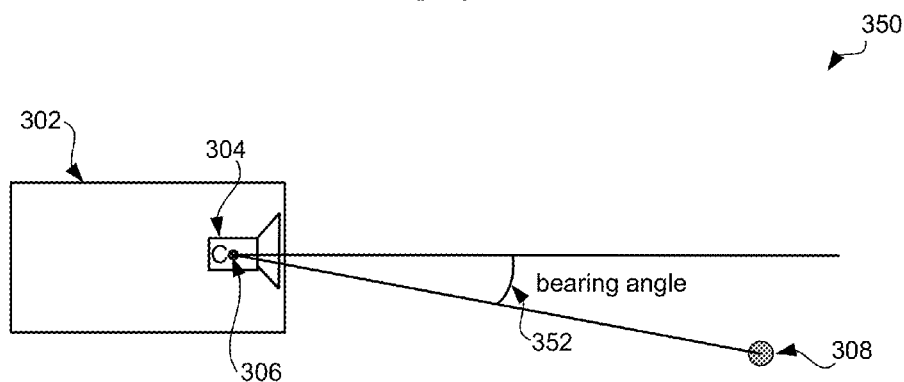
FIG. 3B is a picture illustrating a bearing, relative to a mobile agent, of a landmark object.

FIG. 3B depicts the exemplary scene, shown in a side view in FIG. 3A, in a top view 350. FIG. 3B illustrates the relationship between the mobile agent 302, the camera 304, the camera projection center, C, 306, the landmark object 308 and a bearing angle 352.

Figure 4:
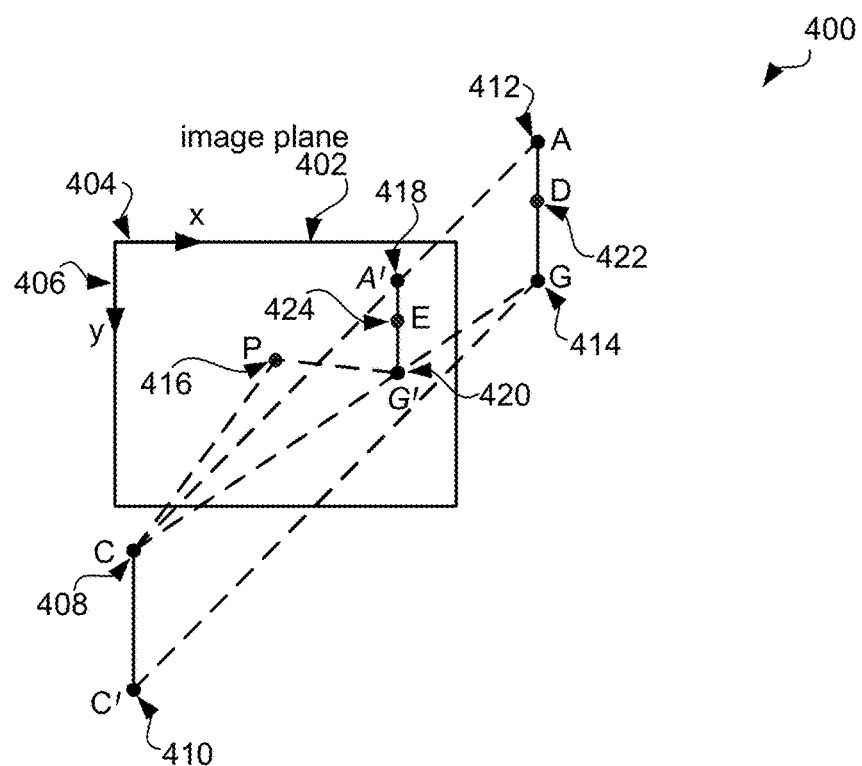
FIG. 4 is a picture illustrating a geometrical relationship between an onboard camera, an image plane and a landmark object.

FIG. 4 is a picture 400 that illustrates the geometrical relationship between the points shown in FIG. 3A and FIG. 3B to an image plane 402 with an x-dimension 404 and a y-dimension 406. The camera projection center, C, 408 and the projection, C', 410 of the camera projection center, C, 408, on the ground are shown. The top point, A, 412 of the landmark object and the point, G, 414 at which the landmark object touches the ground are shown. The principle point, P, 416 of the image is shown in the image plane 402. The projection, A', 418 of the top point, A, 412 of the landmark object is shown in the image plane 402. The projection, G', 420 of the point, G, 414 at which the landmark object touches the ground is shown in the image plane 402. Additionally, a virtual point, D, 422 on the landmark object that has the same height as the camera, with respect to the ground, and its projection, E, 424 on the image plane 402 are shown.

In some embodiments of the present invention, the distance may be computed from the camera projection center, C, to the plane, which may be denoted Plane (AG), parallel to the image plane and containing the top point, A, of the landmark object and the point, G, at which the landmark object touches the ground. The distance, which may be denoted CPlane (AG), may be computed according to:

$$\text{distance} = CPlane(AG) = f \cdot \frac{H}{h} = f \cdot \frac{AG}{A'G'},$$

where f may denote the camera focal length in pixels, H, may denote the landmark-object height from the ground in physical units, for example, meters, feet, yards and other physical units, and h may denote the landmark-object height on the image in pixels. The bearing angle may be computed according to:

$$\text{bearing angle} = \theta = \arctan\left(\frac{x - xp}{f}\right),$$

where f may denote the camera focal length, x may denote the x-coordinate of the projection, A', of the top point of the landmark object in the image plane and xp may denote the x-coordinate of the principle point, P, in the image plane. The camera focal length, f, and the x-coordinate, xp, of the principle point, P, may be determined by a camera calibration process, the landmark-object height, H, from the ground may be premeasured and the landmark-object height, h, on the image and the x-coordinate, x, of the projection, A', of the top point of the landmark object in the image plane may be measured in the image as part of the distance computation. In these embodiments, a landmark object is assumed to be parallel to the camera image plane. When the camera image plane and the landmark object are perpendicular to the ground plane, this condition holds.

In alternative embodiments of the present invention, the distance may be determined by first computing the coordinates of G' on the image plane. Denoting the coordinates of A' on the image plane by [x, y], then the coordinates of G' on the image plane may be given by [x, y+h], where h may denote the landmark-object height on the image. Then the length of PG' may be computed according to:

$$PG' = \sqrt{(xp-x)^2 + (yp-y-h)^2},$$

where [xp, yp] may denote the coordinates of P in the image plane. The length of CG' may be computed using the right triangle CPG' according to:

$$CG' = \sqrt{(CP)^2 + (PG')^2} = \sqrt{f^2 + (PG')^2}.$$

Then the length of CG may then be computed using similar triangles CG'A' and CGA according to:

$$CG = \frac{CG' \cdot AG}{A'G'} = \frac{CG' \cdot H}{h},$$

and the length C'G may be computed using the right triangle CC'G according to:

$$C'G = \sqrt{(CG)^2 - (CC')^2} = \sqrt{(CG)^2 - (H_C)^2},$$

where $H_C$ may denote the height of the camera above the ground and C'G is the distance of the mobile agent from the landmark object.

The bearing angle may be computed by first determining the camera height, EG', on the image plane using similar triangle geometry according to:

$$\frac{EG'}{DG} = \frac{A'G'}{AG} \rightarrow EG' = \frac{DG \cdot A'G'}{AG} = \frac{H_C \cdot h}{H}.$$

The coordinate on the image plane of E may be computed according to [x,(y+h−EG')] and used to compute the length of PE according to:

$$PE = \sqrt{(xp-x)^2 + (yp-y-h+EG')^2}.$$

The angle between ray CP and CE may be computed using the right triangle CPE according to:

$$\tan(\theta) = \frac{PE}{CP} \rightarrow \theta = \begin{cases} \arctan\left(\frac{PE}{f}\right), & \text{if } E \text{ is to the right of } P \\ -\arctan\left(\frac{PE}{f}\right), & \text{if } E \text{ is to the left of } P \end{cases}.$$

Figure 5:
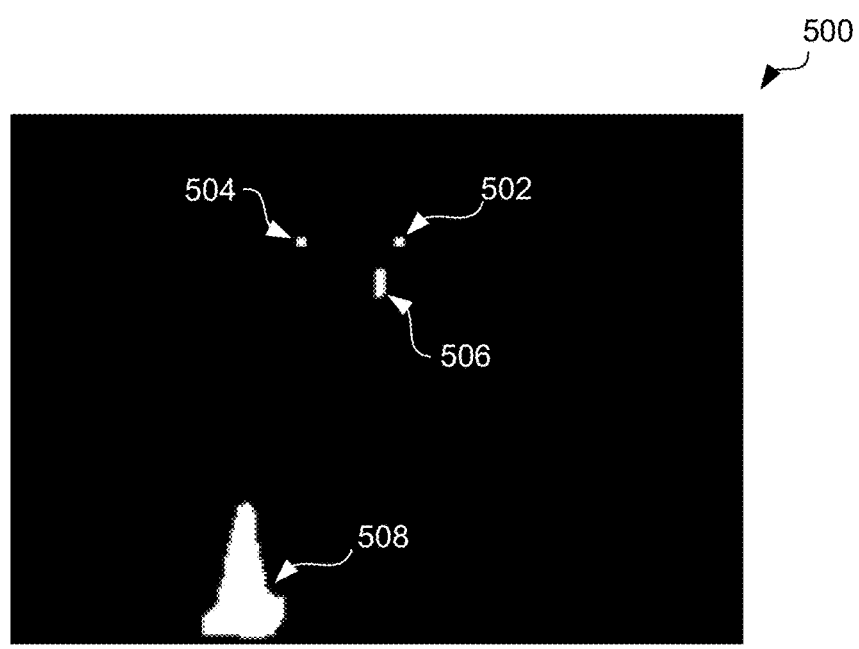
FIG. 5 is a picture of an exemplary binary landmark-object map generated in accordance with embodiments of the present invention.

Referring again to FIG. 1, the nearest landmark object may be selected 114. In some embodiments of the present invention, the nearest landmark object may be the landmark object with the shortest distance between the mobile agent and the landmark object as computed according to embodiments of the present invention described above. In alternative embodiments, the nearest landmark object may be the landmark object with the largest area in the camera image. The landmark object with the largest area in the camera image may be determined by examining the binary landmark-object map. The number of pixels associated with each landmark object may be counted, and the landmark object associated with the greatest number of pixels may be selected as the nearest landmark object. FIG. 5 depicts an exemplary binary landmark-object map 500 comprising four landmark objects 502, 504, 506, 508. The largest landmark object 508 may be selected as the nearest landmark object according to embodiments of the present invention.

Mobile-agent speed and steering control values may be computed using the distance and bearing angle for the selected nearest landmark object. In some embodiments of the present invention, the mobile agent may require two driving control values for controlling the movement of the mobile agent: a forward speed and a steering parameter. The absolute value of the speed may define the moving velocity of the mobile agent. A negative value of the speed may make the mobile agent move in reverse. The absolute value of the steering parameter may define the rotational speed, also referred to as the turning speed, of the mobile agent. A positive steering parameter value may effectuate a turn to the right, and a negative steering parameter value may effectuate a turn to the left.

In some embodiments of the present invention, control of the mobile agent may comprise effectuating faster movement when the mobile agent is further from the target landmark object slower movement when the mobile agent is closer to the target landmark object. In some embodiments of the present invention, the forward speed of the mobile agent may be limited to a predetermined maximum value. In some embodiments of the present invention, a speed control value may be determined according to:

$$\text{speed} = \begin{cases} \text{nomspeed}, & \text{distance} > T_2 \\ \alpha * \text{nomspeed}, & T_2 > \text{distance} > T_1, \\ 0, & \text{distance} \leq T_1 \end{cases}$$

where $\alpha$ may denote a proportionality constant, nomspeed may denote a speed value associated with a normal driving speed of the mobile agent and $T_1$ and $T_2$ may be threshold values. In some exemplary embodiments of the present invention, $T_1=3$ meters, $T_2=1$ meter and $\alpha=0.5$. In some embodiments of the present invention, the normal driving speed of the mobile agent may be related to one or more factors, for example, the maximum speed at which the mobile agent is capable of driving, the driving conditions, the terrain and other environmental conditions.

In some embodiments of the present invention, the rotational speed may be set to a higher value when the bearing angle relative to the target landmark object is large and to a lower value when the bearing angle relative to the target landmark object is small. In some embodiments of the present invention, a steering control value may be determined according to:

$$\text{steering} = \beta * \text{bearing},$$

where $\beta$ may denote a proportionality constant, and in some exemplary embodiments $\beta=2$.

Referring again to FIG. 1, the computed control values may be sent 118 to the control component of the mobile agent.

In some embodiments of the present invention, each landmark object may be associated with one or more unique machine-readable codes, for example, a bar-code, a QR-code, a Data Matrix code, an Aztec code and other machine-readable codes, in order to encode information specific to the landmark object. QR-codes may be advantageous due to several factors: a QR-code can encode a relatively large amount of information; the QR-code pattern may be scanned from a large viewing angle; QR-codes have error correction against noise; and a QR-code is easy to generate.

Some embodiments of the present invention may associate a QR-code with each landmark object. In some embodiments of the present invention, a QR code with a large barcode size and a high error-correction rate may be used. In some embodiments of the present invention, the QR-code associated with a landmark object may be replicated and presented on two perpendicular surfaces in proximity to the landmark object.

Figure 6:
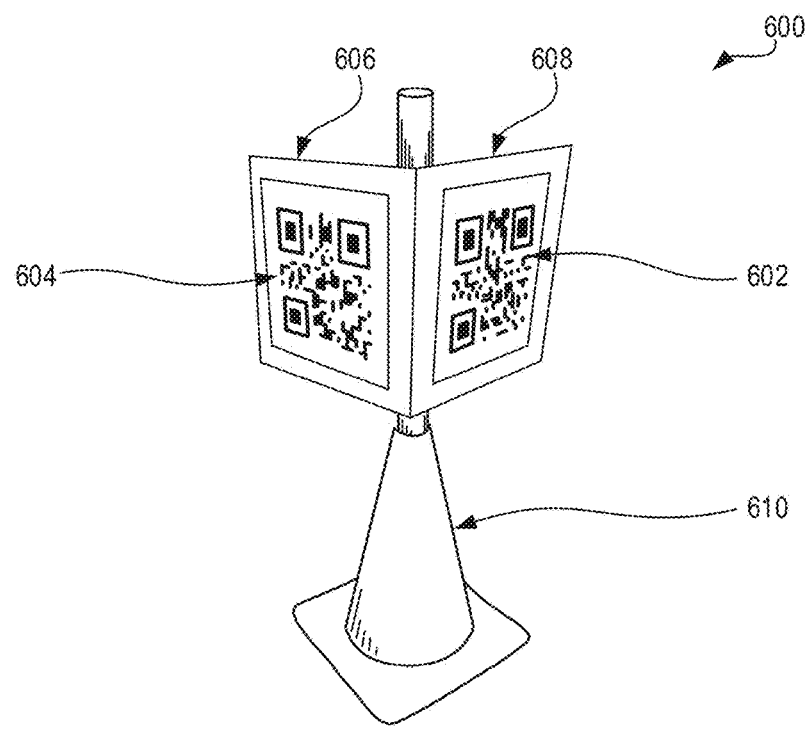
FIG. 6 is a picture of exemplary landmark object and an associated machine-readable code in accordance with the present invention.

FIG. 6 depicts an exemplary QR-code/landmark object arrangement 600 conforming to exemplary embodiments of the present invention wherein the QR-code 602, 604 associated with a landmark object 610 may be replicated and presented on two perpendicular surfaces 606, 608 in proximity to the landmark object 610.

Figure 7:
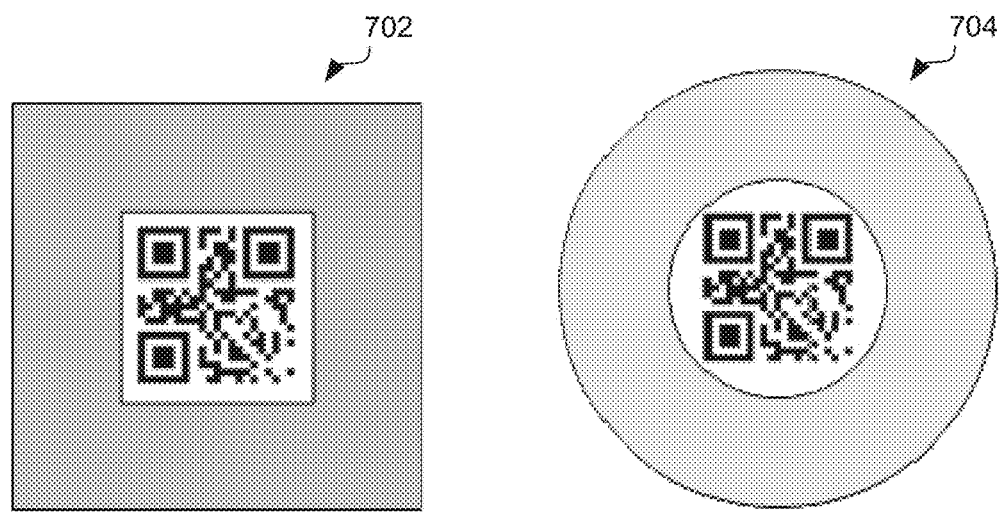
FIG. 7 is a picture of two exemplary landmark objects each comprising an integrated machine-readable code in accordance with the present invention.

In some embodiments of the present invention, the unique machine-readable code may be integrated within the landmark object. For example, the landmark object may comprise a highly visible area of a specific color and shape, and the unique machine-readable code may be positioned within the highly visible area. FIG. 7 depicts two exemplary landmark objects 702, 704 with integrated QR-codes.

In some embodiments of the present invention, the unique machine-readable code may encode an identifying key that may be used to look-up information associated with the unique machine-readable code and the associated landmark object. In some embodiments of the present invention, the information may be stored in a database. In some embodiments of the present invention, the database may be stored on the mobile agent. In alternative embodiments of the present invention, the database may be stored on a server. In yet alternative embodiments, the database may be stored on both the mobile agent and a server.

In alternative embodiments, information associated with the associated landmark object may be directly encoded within the associated machine-readable code.

Figure 8:
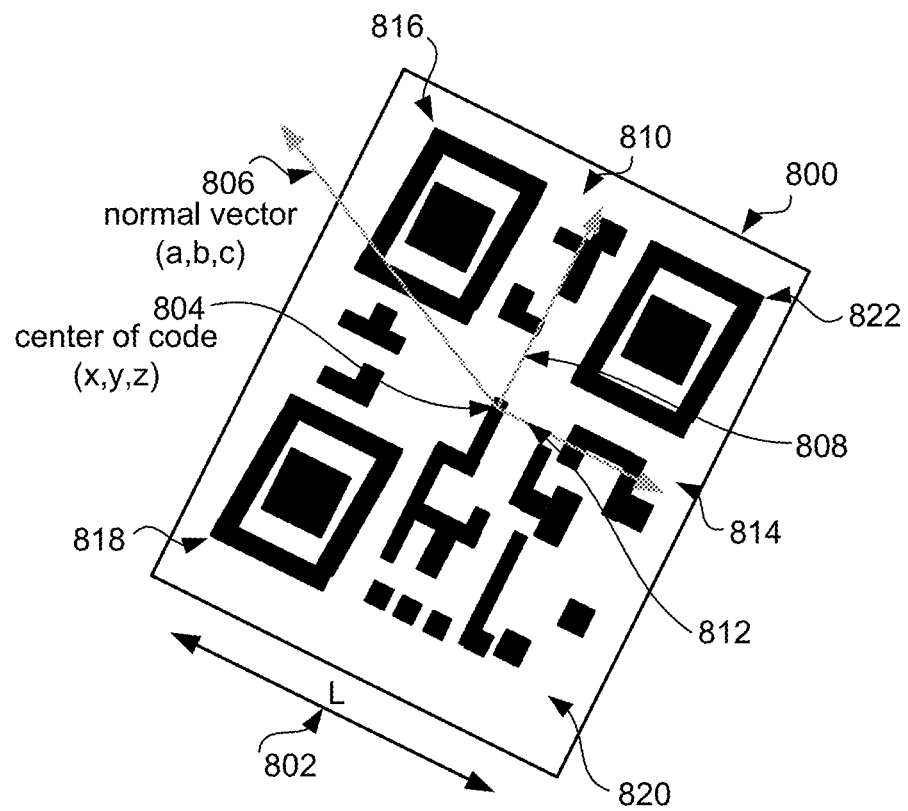
FIG. 8 is picture illustrating exemplary information stored in conjunction with a machine-readable code.

Exemplary embodiments of the present invention may be described in relation to FIG. 8 and FIG. 9. In these exemplary embodiments, a two-dimensional machine-readable code may be associated with a landmark object. An illustrative two-dimensional machine-readable code 800 is depicted in FIG. 8. The two-dimensional machine-readable code 800 may be square in dimension. In some embodiments of the present invention, an identifying key may be encoded on the two-dimensional machine-readable code 800. A length 802, which may be denoted L, of a side of the two-dimensional machine-readable code 800, a center point 804, which may be denoted (x, y, z), of the two-dimensional machine-readable code 800 and a normal vector 806, which may be denoted (a,b,c), to the plane of the two-dimensional machine-readable code 800 may be stored in a database at an entry associated with the identifying key for the two-dimensional machine-readable code 800. From the stored information, a vector 808 to a first edge 810 of the two-dimensional machine-readable code 800, a vector 812 to a second edge 814 of the two-dimensional machine-readable code 800 and four corner points 816, 818, 820, 822 of the two-dimensional machine-readable code 800 may be computed. All of the stored information and computed information may be in world coordinates and dimensions.

In some embodiments of the present invention, a route may be identified by a plurality of landmark-object identifiers. The plurality of landmark-object identifiers may be stored in an order defining the route. Each landmark-object identifier in the plurality of landmark-object identifiers may be associated with a position of a corresponding landmark object. In some embodiments of the present invention described in relation to FIG. 9, a method 900 for autonomous navigation of the route defined by the ordered plurality of landmark-object identifiers may be described.

A captured image may be received 902. The received, captured image may be scanned 904 to locate a two-dimensional machine-readable code. A determination 906 may be made to determine whether or not a two-dimensional machine-readable code was detected in the received, captured image. If a two-dimensional machine-readable code was not detected 908, then the method may continue to receive a next captured image 902.

If a two-dimensional machine-readable code was detected 910, then the encoded data may be extracted 912. In some embodiments of the present invention, the extracted data may comprise an identifying key. The identifying key, or other extracted data, may be used to retrieve 914 information associated with the two-dimensional machine-readable code. In some embodiments of the present invention, the retrieved information may comprise a length of a side of the two-dimensional machine-readable code, a center point of the two-dimensional machine-readable code and a normal vector to the plane of the two-dimensional machine-readable code.

From the stored information, a vector to a first edge of the two-dimensional machine-readable code, a vector to a second edge of the two-dimensional machine-readable code and four corner points of the two-dimensional machine-readable code may be computed 916. All of the stored information and computed information may be in world coordinates and dimensions.

The locations, in the received, captured image, of the four corner points of the two-dimensional machine-readable code may be determined 918.

Using the four pairs of coordinates for the corner points, wherein each pair of coordinates comprises a world coordinate and an image coordinate, a rotation matrix and a translation matrix describing the pose of the camera relative to the landmark object associated with the two-dimensional machine-readable code may be computed 920. In some embodiments of the present invention, a Perspective-n-Point (PnP) algorithm, known in the art, may be used to compute the pose of the camera relative to the object.

The position of the next landmark object on the route may be obtained 922 from the plurality of landmark-object identifiers.

Using the position of the next landmark object on the route, the position of the current landmark object and the pose of the camera relative to the current landmark object, a turning angle for the mobile agent may be computed 924. The mobile agent may execute the turn and drive towards the position of the next landmark object. The method may continue to receive a next captured image 902.

In some embodiments of the present invention, a four-capital-letter string, for example, AAAA, AAAB, BBBA and other four letter strings consisting of capital letters, may be used as an identifier key. The identifier key may be embedded within the machine-readable code. In some embodiments of the present invention, multiple machine-readable codes may be associated with one landmark object. In some of these embodiments, two identifiers may be used to identify a landmark object and the associated machine-readable codes. In alternative embodiments, a two-level identifier may be used. In yet alternative embodiments, a single identifier comprising two parts may be used. For example, a first portion of the identifier may identify the landmark object, and a second portion of the identifier may identify the machine-readable code.

In some embodiments of the present invention, the first two letters of a four-capital-letter string may identify the landmark object and the last two letters of the four-letter-capital-letter string may identify a machine-readable code associated with the landmark object. Records indexed by the identifying key may be stored in a database. The following records illustrate some exemplary records:

KEY AAAA:
ID: "AAAA"
L: 0.14
x: 0.
y: 0.
z: 0.
a: 1.
b: 0.
c: 0.
KEY AAAB:
ID: "AAAB"
L: 0.14
x: 0.
y: 0.
z: 0.
a: 0.
b: 0.
c: −1.
KEY BBBA:
ID: "BBBA"
L: 0.14
x: 0.
y: 0.
z: 10.
a: 0.
b: 0.
c: −1.
KEY BBBB:
ID: "BBBB"
L: 0.14
x: 0.
y: 0.
z: 10.
a: 1.
b: 0.
c: 0.

In these exemplary records, the information L, x, y, z, a, b and c correspond to a length, L, of a side of a two-dimensional machine-readable code, a center point, (x, y, z), of the two-dimensional machine-readable code and a normal vector, (a,b,c), to the plane of the two-dimensional machine-readable code, respectively. The identifiers "AAAA" and "AAAB" are associated with a first landmark object, and the identifiers "BBBA" and "BBBB" are associated with a second landmark object. In alternative embodiments of the present invention, additional information may be stored in each record.

In some embodiments of the present invention, Visual Odometry (VO) may be used to measure a turning angle of a mobile agent as the mobile agent executes a turn in preparation to drive to a next landmark. In some embodiments of the present invention, described in relation to FIG. 10, when a mobile agent begins a turn, a VO measurement method may be initiated 1002. In some embodiments of the present invention, a VO measurement may be made in accordance with methods and systems described in U.S. patent application Ser. No. 14/476,524, entitled "Methods and Systems for Vision-Based Motion Estimation," invented by Xinyu Xu, Miao Liao and Petrus J. L. van Beek, filed on Sep. 3, 2014, said application is hereby incorporated by reference herein in its entirety.

The measured angle 1004 indicating the rotation of the mobile agent may be accumulated between captured frames, and a determination may be made to determine 1006 if the accumulated angle is greater than the target angle, wherein the target angle may be the desired turning angle. If the accumulated angle is 1008 greater than the target angle, the mobile agent may stop 1010. If the accumulated angle is not 1012 greater than the target angle, the mobile agent may continue to turn, and the VO measurements may continue to accumulate measured angles.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for autonomous navigation, said method comprising:
    capturing an image;
    performing landmark detection on said captured image, thereby identifying one or more detected landmark objects;
    computing a distance and a bearing for each detected landmark object in said one or more detected landmark objects;
    selecting a nearest landmark object, from said one or more detected landmark objects, using said computed distances;
    computing a mobile-agent speed control value and a mobile-agent steering control value for said nearest landmark object using said computed distance for said nearest landmark object and said computed bearing for said nearest landmark object; and
    sending said mobile-agent speed control value and said mobile-agent steering control value to a control component of a mobile agent.

2. A method as described in claim 1, wherein said performing landmark detection comprises:
    receiving a captured image;
    generating a plurality of candidate landmark regions in said captured image; and
    determining an association for each landmark region, in said plurality of candidate landmark regions, with a landmark object in a plurality of existing landmark objects.

3. A method as described in claim 2, wherein said performing landmark detection further comprises indicating any unobserved landmark objects from said plurality of existing landmark objects.

4. A method as described in claim 3, wherein said performing landmark detection further comprises deleting a dematerialized landmark object from said plurality of existing landmark objects, wherein said dematerialized landmark object is a landmark object from said plurality of landmark objects indicated as unobserved for a number of frames.

5. A method as described in claim 2, wherein said performing landmark detection further comprises:
    creating a first new landmark object associated with a first candidate landmark region, in said plurality of candidate landmark regions, when said determining an association for each landmark region does not generate an association for said first candidate landmark region; and
    adding said first new landmark object to said plurality of existing landmark objects.

6. A method as described in claim 2, wherein said generating a plurality of candidate landmark regions comprises:
    generating a plurality of initial candidate landmark regions based on a color model;
    performing a merging operation on said plurality of initial candidate landmark regions to form a plurality of merged candidate landmark regions; and
    performing a filtering operation on said plurality of merged candidate landmark regions to form said plurality of candidate landmark regions.

7. A method as described in claim 2 further comprising updating a feature associated with a first existing landmark object with a feature value computed for a first candidate landmark region, wherein said first candidate landmark region is associated with said first existing landmark object.

8. A method as described in claim 1, wherein said mobile-agent speed control value is:
    proportional to a normal driving speed for said mobile agent when said computed distance for said nearest landmark object is between a first distance threshold and a second distance threshold;
    equal to zero when said computed distance for said nearest landmark object is less than or equal to said first distance threshold; and equal to said normal driving speed when said computed distance for said nearest landmark object is greater than said second threshold.

9. A method as described in claim 1, wherein said mobile-agent steering control value is proportional to said computed bearing for said nearest landmark object.

10. A mobile agent comprising:
   a camera for capturing an image;
   a control component; and
   a non-transitory computer-readable medium encoded with a computer program code for implementing a method for autonomous navigation, said method comprising:
      performing landmark detection on said captured image, thereby identifying one or more detected landmark objects;
      computing a distance and a bearing for each detected landmark object in said one or more detected landmark objects;
      selecting a nearest landmark object, from said one or more detected landmark objects, using said computed distances;
      computing a mobile-age speed control value and a mobile-agent steering control value for said nearest landmark object using said computed distance for said nearest landmark object and said computed bearing for said nearest landmark object; and
      sending said mobile-agent speed control value and said mobile-agent steering control value to said control component.

* * * * *